(12) United States Patent
Peek

(10) Patent No.: US 7,010,335 B2
(45) Date of Patent: Mar. 7, 2006

(54) APPARATUS AND METHOD TO PROVIDE ANTENNA DIVERSITY

(75) Inventor: Gregory A. Peek, North Plains, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 10/607,724

(22) Filed: Jun. 27, 2003

(65) Prior Publication Data

US 2004/0266501 A1  Dec. 30, 2004

(51) Int. Cl.
*H01B 1/40* (2006.01)
*H01B 7/02* (2006.01)

(52) U.S. Cl. .................................... 455/575.7; 455/88

(58) Field of Classification Search ................ 343/713, 343/841, 853; 455/278.1, 278, 272, 853, 455/575.7, 88, 101
See application file for complete search history.

(56) References Cited

U.S. PATENT DOCUMENTS

| | | | | |
|---|---|---|---|---|
| 5,117,505 A | * | 5/1992 | Talwar | 455/278.1 |
| 5,815,115 A | * | 9/1998 | Carloni et al. | 342/359 |
| 6,005,530 A | * | 12/1999 | Jovanovich et al. | 343/827 |
| 6,175,747 B1 | * | 1/2001 | Tanishima et al. | 455/562.1 |
| 6,201,801 B1 | * | 3/2001 | Dent | 370/342 |
| 6,415,140 B1 | * | 7/2002 | Benjamin et al. | 455/275 |
| 6,816,538 B1 | * | 11/2004 | Hodges et al. | 375/136 |
| 2003/0232633 A1 | * | 12/2003 | Iida et al. | 455/575.7 |

* cited by examiner

*Primary Examiner*—Wilson Lee
*Assistant Examiner*—Minh Dieu A
(74) *Attorney, Agent, or Firm*—Rita M. Wisor

(57) ABSTRACT

Briefly, in accordance with an embodiment of the invention, an apparatus and method to provide antenna diversity to reduce multipath effects is provided. The apparatus may include a primary antenna and a secondary antenna, wherein the antenna gain of the secondary antenna is greater than the antenna gain of the primary antenna. The method may include selectively switching between either a primary antenna or a diversity antenna to receive signals, wherein a gain of the primary antenna is less than a gain of the diversity antenna.

23 Claims, 2 Drawing Sheets

APPARATUS AND METHOD TO PROVIDE ANTENNA DIVERSITY

BACKGROUND

Multipath fading may reduce a radio's ability to receive signals. Since signals reflect off objects and may arrive at a point in space in-phase and out-of-phase, and may combine with interfering signals, this may result in destructive interference. The destructive interference may result in dead spots, where signals may not be received. Wireless designers are continually searching for alternate ways to reduce problems due to multipath.

BRIEF DESCRIPTION OF THE DRAWINGS

The subject matter regarded as the invention is particularly pointed out and distinctly claimed in the concluding portion of the specification. The present invention, however, both as to organization and method of operation, together with objects, features, and advantages thereof, may best be understood by reference to the following detailed description when read with the accompanying drawings in which:

Figure 1:
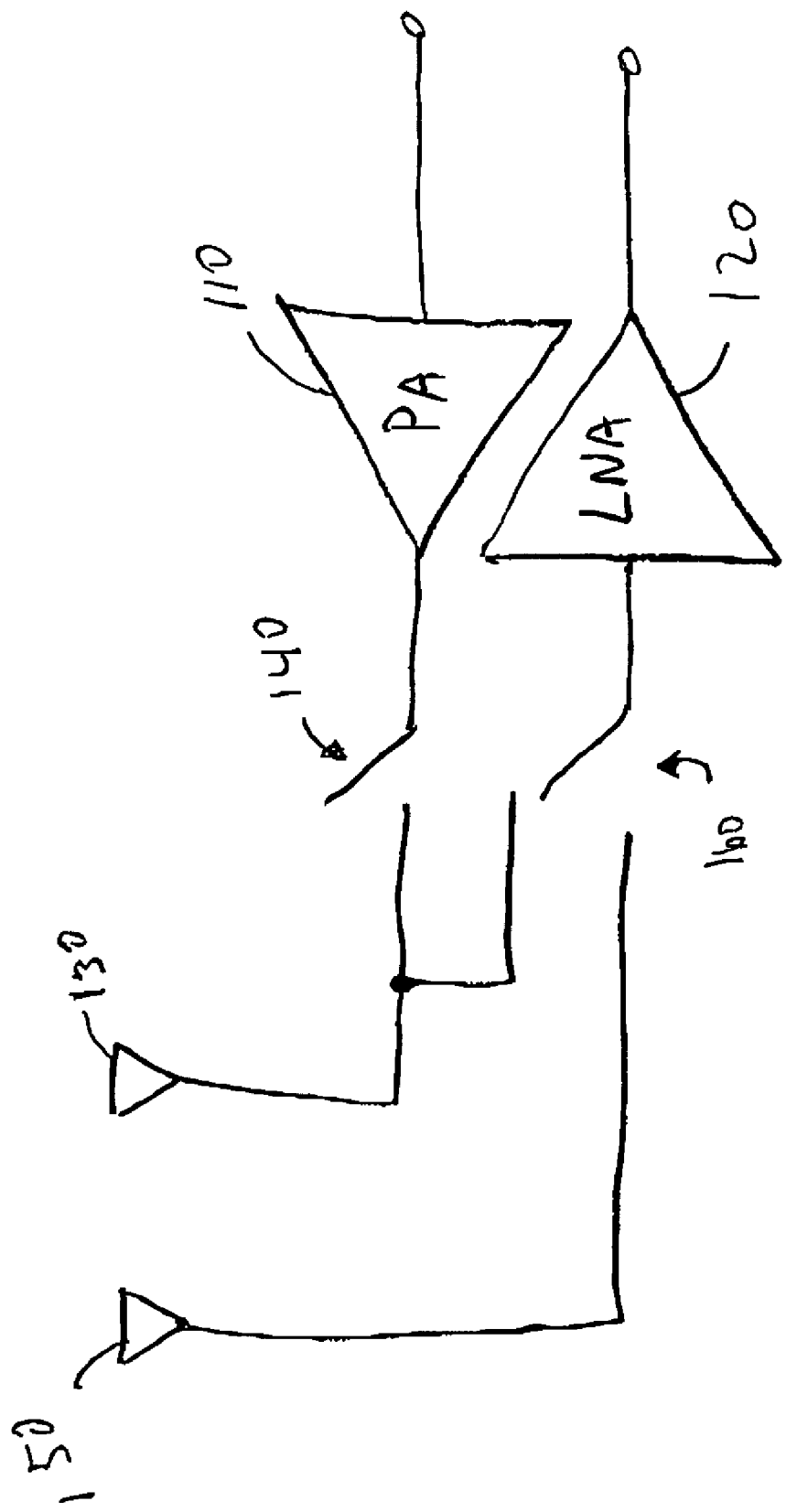
FIG. 1 is a schematic diagram illustrating a portion of a transceiver in accordance with an embodiment of the present invention.

It will be appreciated that for simplicity and clarity of illustration, elements illustrated in the figures have not necessarily been drawn to scale. For example, the dimensions of some of the elements are exaggerated relative to other elements for clarity. Further, where considered appropriate, reference numerals have been repeated among the figures to indicate corresponding or analogous elements.

DETAILED DESCRIPTION

In the following detailed description, numerous specific details are set forth in order to provide a thorough understanding of the present invention. However, it will be understood by those skilled in the art that the present invention may be practiced without these specific details. In other instances, well-known methods, procedures, components and circuits have not been described in detail so as not to obscure the present invention.

In the following description and claims, the terms "include" and "comprise," along with their derivatives, may be used, and are intended to be treated as synonyms for each other. In addition, in the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

Turning to FIG. 1, an embodiment of a portion of a transceiver 100 is illustrated. Transceiver 100 may comprise a transmitting portion that may include a power amplifier (PA) 110. In addition, transceiver 100 may include a receiving portion that may include a low noise amplifier (LNA) 120. Although the scope of the present invention is not limited in this respect, transceiver 100 may be implemented using a direct conversion or a super-heterodyne receiver architecture. For simplicity, all the components of transceiver 100 have not been shown.

An antenna 130 may be switchably coupled to an output terminal of PA 110. In one example, antenna 130 may be coupled to the output terminal of PA 110 via a switch 140. In this example, if switch 140 is open, then the output terminal of PA 110 may be disconnected from antenna 130. Conversely, if switch 140 is closed, the output terminal of PA 110 may be connected to antenna 130.

An antenna 150 may be switchably coupled to an input terminal of LNA 120. In addition, the input terminal of LNA 120 may be selectively coupled to either antenna 130 or antenna 150 using a switch 160. In one example, switch 160 may be in a first position to disconnect antenna 150 from the input terminal of LNA 120 and to connect antenna 130 to the input terminal of LNA 120. Alternatively, switch 160 may be in a second position to connect antenna 150 to the input terminal of LNA 120 and to disconnect antenna 130 from the input terminal of LNA 120. It should be noted that the use of the terms "first position" and "second position" is arbitrary.

In one embodiment, switches 140 and 160 may be relatively low resistance switches such as, for example, micro-electromechanical systems (MEMS) switches. A MEMS switch may be a mechanical switch implemented using semiconductor materials and processes. In alternate embodiments, switches 140 and 160 may be implemented using transistors or diodes. For example, switches 140 and 160 may be implemented using PIN diodes, although the scope of the present invention is not limited in this respect.

Antennas 130 and 150 may provide "antenna diversity" to reduce problems due to destructive interference from multipath fading or interference signals. Antennas 130 and 150 may be separated by a predetermined distance, e.g., at least about two centimeters (cm), to provide antenna diversity. In one embodiment, antennas 130 and 150 are separated by a distance of at least about 15 cm. The spatial separation of antennas 130 and 150 may decrease the likelihood that both antennas 130 and 150 receive the same combination of multipath-faded signals.

In some embodiments, antenna 130 may be used to transmit and receive signals such as, for example, radio frequency (RF) signals, and may be referred to as a primary antenna, a transmit antenna, or a transmit and receive antenna. Antenna 130 may be used to transmit signals over the air. Antenna 150 may be used to receive signals and may be referred to as a secondary antenna, diversity antenna, or a receive only antenna.

In one embodiment, antenna diversity may be accomplished by measuring the signal strength of signals received from antennas 130 and 150 using circuitry of transceiver 100 not shown in FIG. 1. The signal strength of signals received using antennas 130 and 150 may be compared by circuitry (not shown) of transceiver 100. In one embodiment, if the signal strength of a signal received using antenna 150 is greater than the signal strength of a signal received using antenna 130, then antenna 150 may be used to receive signals by connecting the input terminal of LNA 120 to antenna 150 and disconnecting the input terminal of LNA 120 from antenna 130.

Although the scope of the present invention is not limited in this respect, in some embodiments, the output power of PA 110 may be at least about 14 dBm. In one example, the output power of PA 110 may range from about 17 dBm to about 24 dBm. In other embodiments, the output power of PA 110 may be at least about zero dBm or about 4 dBm. For example, some wireless personal area network (WPAN) devices may have an output power of about zero dBm.

In one embodiment, the gain of antenna 150 may be greater than the gain of antenna 130. Although the scope of the present invention is not limited in this respect, antenna 150 may have a gain of at least about 6 dBi and antenna 130 may have a gain of less than about 6 dBi. In one example, antenna 150 may have a gain of at least about 12 dBi and antenna 130 may have a gain of less than about 3 dBi, although the scope of the present invention is not limited in this respect. In another example, antenna 130 may have a gain of less than about zero dBi, although the scope of the present invention is not limited in this respect. As may be appreciated, in this example, antenna 150 may have a highly directional radiation pattern compared to antenna 130, and therefore, antenna 150 may be capable of receiving signals at a greater horizontal distance compared to antenna 130. Generally, increasing the gain of an antenna may result in a relatively higher gain antenna having a more directional radiation pattern that may be capable of receiving signals from a greater horizontal distance, but at less of a vertical distance compared to a lower gain antenna.

Although the scope of the present invention is not limited in this respect, in one embodiment, antenna 150 may be a dipole antenna such as, for example, a "stub" or "whip" antenna. In another embodiment, antenna 150 may be a stacked dipole antenna. A stacked dipole antenna may be formed by stacking two or more dipole antennas together. Generally, a stacked dipole antenna may have a greater antenna gain compared to a non-stacked dipole antenna.

Although the scope of the present invention is not limited in this respect, in alternate embodiments, antenna 130 may be a dipole antenna, a microstrip patch antenna, or an inverted-F antenna. A patch antenna may be layer of metal, e.g., copper, over a ground plane and may be separated by an insulator material. An inverted-F antenna may be made using a of sheet of metal, e.g., tin or some shielding material, that may be bent in the shape of an "F" but backwards, wherein the center of the "F" is driven, and other side is grounded.

Although the scope of the present invention is not limited in this respect, transceiver 100 may be adapted to process a variety of wireless communication protocols such wireless personal area network (WPAN) protocols, wireless local area network (WLAN) protocols, wide area network (WAN) protocols, wireless metropolitan area network (WMAN) protocols, or cellular protocols.

In one example, transceiver 100 may be used in a WLAN access point (AP) (not shown). In this example, the output power of power amplifier 110 may be about 24 dBm and antennas 130 and 150 may have a antenna gains of about 6 dBi and about 12 dBi, respectively. A client, e.g., a laptop computer (not shown), may communicate wirelessly with the AP. The laptop may have an output power of about 14 dBm and may have a receive antenna having a gain of about zero dBi. In this example, even though the laptop is transmitting at a relatively low power, the AP may still receive signals from the laptop at relatively large distances since the AP has a relatively high gain receive antenna, i.e., antenna 150. In addition, even though the laptop is using a relatively lower gain receive antenna in this example, the laptop may still be able to receive signals from the AP since the AP is transmitting signals at a relatively high output power.

Figure 2:
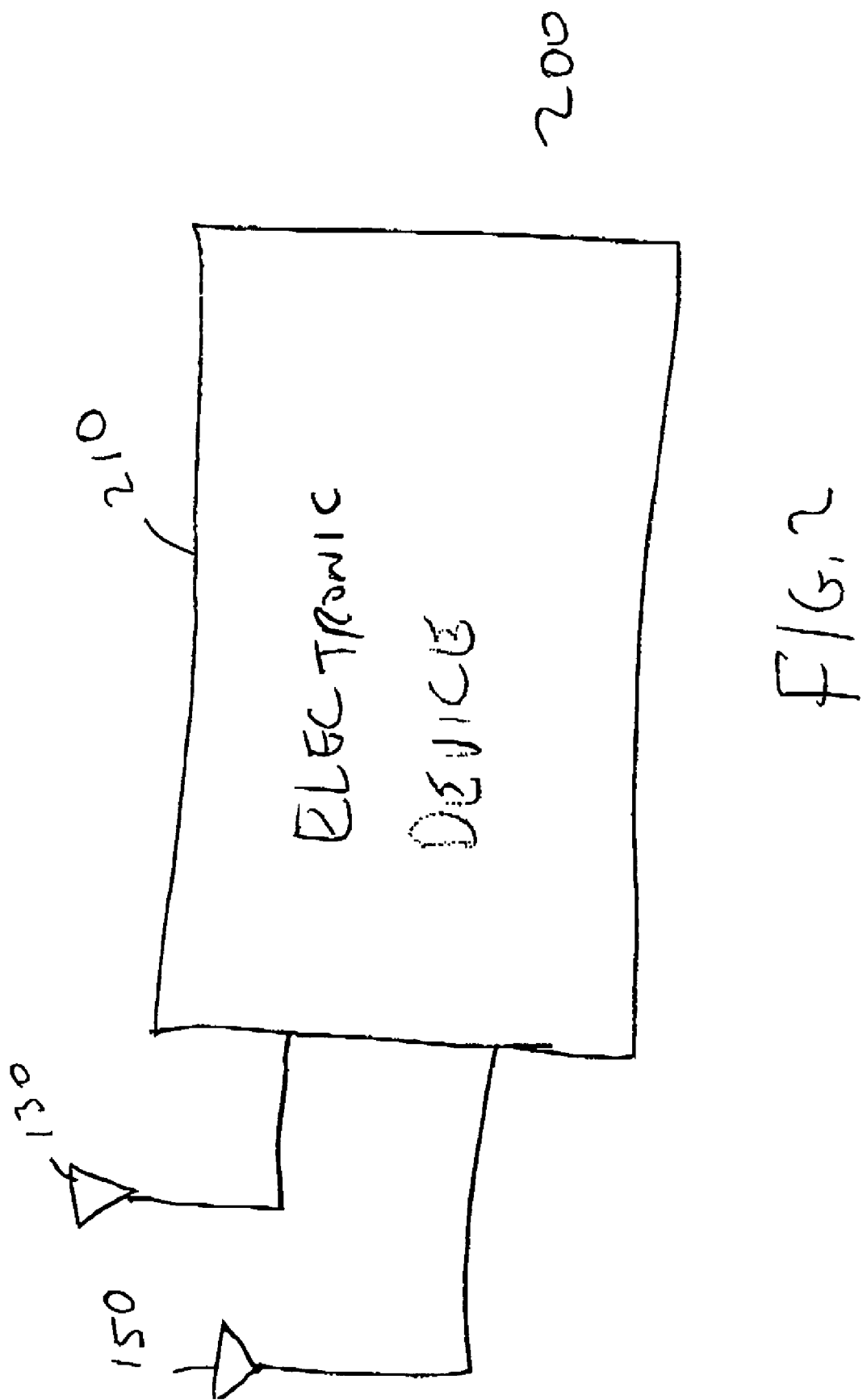
FIG. 2 is a block diagram illustrating a wireless device in accordance with an embodiment of the present invention.

FIG. 2 is a block diagram of a wireless device 200 in accordance with an embodiment of the present invention. As shown in FIG. 2, wireless device 200 may comprise an electronic device 210 that may include a transceiver such as, for example, transceiver 100 described above. Antennas 130 and 150 are illustrated in FIG. 2, and the gain of antenna 130 may be less than the gain of antenna 150 as described above.

Although the scope of the present invention is not limited in this respect, wireless device 200 may be a personal digital assistant (PDA), a laptop or portable computer with wireless capability, an wireless local area network (WLAN) access point (AP), a web tablet, a wireless telephone, a pager, an instant messaging device, a digital music player, a digital camera, or other devices that may be adapted to transmit and/or receive information wirelessly. In other embodiments, wireless device 200 may be a set-top box, a gateway, or a multimedia center with wireless capability. The gateway may include a digital subscriber line (DSL) modem or a cable modem, and a router. The multimedia center may include a personal video recorder (PVR) and a digital video disc (DVD) player.

Wireless device 200 may be used in any of the following systems: a wireless personal area network (WPAN) system, a wireless local area network (WLAN) system, wide area network (WAN), a wireless metropolitan area network (WMAN), or a cellular system, although the scope of the present invention is not limited in this respect. An example of a WLAN network includes the Industrial Electrical and Electronics Engineers (IEEE) 802.11 standard. An example of a WMAN network includes the Industrial Electrical and Electronics Engineers (IEEE) 802.16 standard. An example of a WPAN system includes Bluetooth™ (Bluetooth is a registered trademark of the Bluetooth Special Interest Group). Examples of cellular systems include: Code Division Multiple Access (CDMA) cellular radiotelephone communication systems, Global System for Mobile Communications (GSM) cellular radiotelephone systems, Enhanced data for GSM Evolution (EDGE) systems, North American Digital Cellular (NADC) cellular radiotelephone systems, Time Division Multiple Access (TDMA) systems, Extended-TDMA (E-TDMA) cellular radiotelephone systems, GPRS, third generation (3G) systems like Wide-band CDMA (WCDMA), CDMA-2000, Universal Mobile Telecommunications System (UMTS), or the like.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

What is claimed is:

1. An apparatus, comprising:
   a primary antenna having a gain; and
   a secondary antenna having a gain greater than the gain of the primary antenna, wherein the gain of the secondary antenna is at least about 6 dBi;
   wherein the primary antenna is a transmit and receive antenna and the secondary antenna is a receive only antenna.

2. The apparatus of claim 1, wherein the gain of the secondary antenna is at least about 12 dBi.

3. The apparatus of claim 1, wherein the gain of the primary antenna is less than about 6 dBi.

4. The apparatus of claim 1, wherein the gain of the primary antenna is less than about 3 dBi.

5. The apparatus of claim 1, wherein the primary antenna is a dipole antenna and the secondary antenna is a dipole antenna.

6. The apparatus of claim 1, wherein the secondary antenna is a stacked dipole antenna.

7. The apparatus of claim 1, wherein the primary secondary antenna is a dipole antenna, a microstrip patch antenna, or an inverted-F antenna.

8. The apparatus of claim 1, further comprising a powder amplifier (PA) having an output terminal coupled to the primary antenna via switch.

9. The apparatus of claim 8, wherein the power amplifier has an output power of at least about 17 dBm.

10. The apparatus of claim 1, further comprising a low noise amplifier (LNA) having an input terminal selectively coupled to either the primary antenna or the secondary antenna.

11. An apparatus, comprising:
a first antenna to transmit and receive signals; and
a second antenna to only receive signals and having a gain greater than a gain of the first antenna, wherein the second antenna is separate from the first antenna.

12. The apparatus of claim 11, wherein the gain of the second antenna is at least about 6 dBi.

13. The apparatus of claim 11, wherein the gain of the first antenna is less than about 6 dBi.

14. A system, comprising:
a wireless local area network (WLAN) device comprising:
a primary antenna having a gain; and
a secondary antenna having a gain greater than the gain of the primary antenna, wherein the secondary antenna has a gain of at least about 6 dBi;
wherein the primary antenna is a transmit and receive antenna and the secondary antenna is a receive only antenna.

15. The system of claim 14, wherein the WLAN device is an access point (AP).

16. The system of claim 14, wherein the secondary antenna has a gain of less than about 6 dBi.

17. A method, comprising:
receiving a first signal from a transmit and receive antenna; and
receiving a second signal from a receive only antenna, wherein the receive only antenna has a gain greater than a gain of the transmit and receive antenna and wherein the receive only antenna is separate from the transmit and receive antenna.

18. The method of claim 17, comparing the signal strength of the first signal to the signal strength of the second signal.

19. The method of claim 17, further comprising coupling an input terminal of a low noise amplifier (LNA) to the receive only antenna if the signal strength of the second signal is greater than the signal strength of the first signal.

20. The method of claim 19, further comprising transferring a transmission signal for transmission over the air from an output terminal of a power amplifier (PA) to the transmit and receive antenna.

21. A method, comprising:
selectively switching between either a primary antenna or a diversity antenna to receive signals, wherein a gain of the primary antenna is less than a gain of the diversity antenna and the diversity antenna is discrete from the primary antenna.

22. The method of claim 21, further comprising:
transmitting a signal using the primary antenna;
receiving a signal using the primary antenna; and
receiving a signal using the diversity antenna.

23. The method of claim 21, further comprising coupling an input terminal of a low noise amplifier (LNA) to the diversity antenna after comparing signal strengths of signals received by the primary and diversity antennas.

\* \* \* \* \*

UNITED STATES PATENT AND TRADEMARK OFFICE
CERTIFICATE OF CORRECTION

PATENT NO. : 7,010,335 B2  Page 1 of 1
APPLICATION NO. : 10/607724
DATED : March 7, 2006
INVENTOR(S) : Peek It is certified that error appears in the above-identified patent and that said Letters Patent is hereby corrected as shown below:

In column 5, at line 34, delete "secondary" and insert --primary--.

Signed and Sealed this

Eighteenth Day of November, 2008

JON W. DUDAS
*Director of the United States Patent and Trademark Office*